Patented Oct. 19, 1943

2,332,222

UNITED STATES PATENT OFFICE 2,332,222

ROOFING AND SIDING GRANULES AND THE LIKE

Norman P. Harshberger, Scarsdale, N. Y., assignor, by mesne assignments, to Carbide and Carbon Chemicals Corporation, New York, N. Y., a corporation of New York No Drawing. Application May 28, 1940, Serial No. 337,577

5 Claims. (Cl. 106—104)

This invention relates to an aluminate cement composition for ornamenting and surfacing, for instance by granules, weather exposed building material, for instance, fiber base material impregnated and coated with waterproofing substances, for instance, bitumen, which may also serve to anchor the granules of the invention. The invention also relates to individual particles of a hardened aluminate cement composition as an aggregate, for instance, in cement coating compositions of similar character. The present application is a continuation-in-part of my copending application Serial No. 83,076, filed June 2, 1936, now Patent No. 2,202,002, which is a continuation-in-part of application Serial No. 675,451, filed June 12, 1933.

Natural stones and stones surfaced with various coatings, for instance, ceramic glazes or Portland cement (typified by Denning, No. 1,876,630) have been proposed for surfacing asphalt composition materials. It has been the custom to partially embed the individual granules into the surface of a water-resistant fibrous base which has previously been provided with an adhesive layer of bitumen, for instance, asphalt, to receive them. The oils of such bitumen have a definite tendency for some period after application of the granules to work up around the granules. This action produces a discoloration in the finished granule surfaced material that is undesirable.

Portland cement coated granules have this tendency to a lesser extent due to some absorption by the coating of such material, but a Portland cement coating is vulnerable to attack by the oils of the bitumen, these having a deteriorating effect on the Portland cement coating. Furthermore, the bond of the granules with bitumen is adversely affected by a Portland cement coating. Also, Portland cement coated granules effloresce in exposure by reason of migrating calcium salts or calcium hydroxide, which form a scum of calcium carbonate crystals at the exposed surface of the granules. Efflorescence is particularly undesirable where the granule surface is other than white in color, as it not only discolors the exposed cement surface of the granules but the migrating salts producing this effect also have a detrimental action upon the tinctorial value of any included coloring matter.

Portland cement coated granules have relatively thin coatings and accordingly have a limited supply of moisture present for hydration. With rapid evaporation of moisture and particularly if the cement coated granules are heated to accelerate set of the cement, the Portland cement does not properly hydrate.

I have discovered that granules that will be substantially free of the foregoing undesirable characteristics may be made by utilizing a composition that is substantially free of soluble matter productive of efflorescence and that comprises aluminate cement and by making the entire structure of the granules of such a composition.

An object of the invention is to provide a granule formed of a hardened, cementitious composition that will be substantially free of objectionable efflorescence in exposure and that will be resistant to adverse influence of the constituents of bituminous coatings to which the granules may be anchored and that will themselves not adversely affect a bond with bitumen.

A further object is the provision of a granule formed of a hardened, cementitious composition, which granule when anchored to a bituminous adhesive is not conducive to blistering thereof; the granule being capable of absorbing in its base portion some of the oils of the bitumen, to substantially prevent penetration of moisture between the granule and the bitumen to which it is anchored, but not to an extent to produce surface discoloration of the granules.

Another object is to provide a granule comprising a hardened aluminate cement composition substantially free of soluble matter productive of objectionable efflorescence in exposure.

A further object is to provide a granule comprising a hardened, high aluminate cement composition including color and substantially free of free lime.

Still another object is to provide an aggregate for non-efflorescing coatings comprising particles of a hardened aluminate cement composition substantially free of free lime.

Another object is to provide granules of a hardened composition comprising a high aluminate cement composition including a mica aggregate, for instance, mica schist.

In accordance with the present invention, I utilize as the cementitious composition, an aluminate cement that is substantially free of soluble matter that will migrate to the surface of the hardened composition in exposure and produce a surface efflorescence, and which cement will produce a hardened and non-softening water-insoluble structure. Preferably I use the high aluminate cements substantially free of free lime, more fully described in my Patent No. 2,202,002 aforesaid, for instance, those carrying between 60% and 95% of calcium aluminates or calcium alumina ferrites. I prefer those made by fusion and in a manner as to be substantially entirely free of free lime, since the granules made from such a composition will have a high degree of freedom from efflorescence produced by migrating salts of soluble matter liberated to the surface during the setting reaction of the cement with water or upon exposure. However, cement compositions comprising high alumina cements not necessarily made by fusion, which may also include quantities of free lime, may be used providing, however, that such free lime has been substantially converted into such products as calcium carbonate in their making as not to react unfavorably for the purposes herein set forth.

The cement may be extended with suitable aggregates and when combined with a proper amount of water and/or other liquids, are such as to yield, upon hardening, a hard and dense structure. The extending materials may include particles of, for instance, marble dust, diatomaceous earth, silica, crushed glass, crushed slag; long or short fibers of, for instance, asbestos, cotton linters, hair, glass wool; coloring agents, for instance, mineral oxides, like chrome or iron oxide; dyes, for instance, coal tar dye, waterproofing and adhesive substances such as natural or synthetic resins, for instance, rosin, phenol aldehyde resins, vinyl resins, asphalt, any of which may be in the form of water emulsions. These additions, one or more, may be incorporated with the cement in such proportions as the character and requirements of the granules to be made will allow. The waterproofing agents will preferably be used in amounts between 1% to 10% and will preferably be of a character to form an emitted film of such substance on the granules in the manner described in copending application aforesaid.

The amount of water to be used with the cement will depend somewhat upon the type of mix, the method of fabrication of the granules, and will readily be determined in actual practice. A water-cement ratio of 0.7 to 0.9 has in many cases been found satisfactory where the composition is to be made in a plastic state. Such should be properly controlled in order to insure proper hydration. In the case of fabricating the granules by propelling into space, the composition will necessarily be of a more liquid character and accordingly, greater amounts of water are contemplated in such case. However, with the type of composition utilized in the present invention, such excess water may be used without serious effect.

In addition to the previous extending materials, I have found that the use of mica flakes of the character provided by mica schist is particularly desirable, and I prefer to use such material as an aggregate for the composition. This mica has the property of water retention and of taking up excess water, which may be incorporated in the formed particles. In this manner, proper hydration in curing of the formed granules is readily assured.

According to my preferred process, I form and hydrate blocks of the cement composition of the invention, that is, I prepare a plastic mixture of cement, filler and water, and form the same into solid masses of suitable size and shape, and following hardening thereof, which need not be complete hardening, I crush the blocks into the form of granules and screen. The preferred granule size will be between 8 and 30 mesh, such being generally suitable for roofing and siding material. I recover the dust and fines occurring in this procedure and either re-employ these as fillers in making further masses for crushing or separate the fines for use as a suitable filler for non-efflorescing cement compositions.

The following are examples of suitable compositions, water being added as required:

No. 1

| | Pounds |
|---|---|
| Cement | 45 |
| Marble | 59.6 |
| Red oxide | 7.9 |

No. 2

| | Pounds |
|---|---|
| Cement | 94 |
| Color | 13.5 |
| Asbestos | 9 |
| Mica schist | 85 |

The granules may be formed by preparing a mixture of the cementitious ingredients of the invention and such extending materials as desired, together with water, to form a plastic mass containing sufficient water for proper hydration of the cement, yet of such plasticity as to be readily extruded through suitable apparatus for this purpose, the extruded material being formed by suitable shaping means into granules as it leaves the forming dies. Subsequently, the formed granules are stored in suitable curing chambers maintained at about 90° F. and a relative humidity of 95%, and wherein the surrounding warm moist air is kept in motion. While in this chamber the granules are preferably kept in motion to prevent agglomeration and are kept there until they have set and are sufficiently hard to be handled.

According to another method, I may prepare the cement composition of the invention in a more liquid state, using a greater amount of water for this purpose, and form globules of such composition by propelling the composition by centrifugal means, spraying or the like, into space in a suitable chamber, preferably provided with suitable temperature control so that the globules may become solid or semi-solid, or at least solidified on the exterior thereof, before their landing upon a collection surface. In using a process of this character, it is preferred to accelerate set of the cement composition by adding to the cementitious composition a suitable ingredient for such purpose. Where the cement composition comprises a high aluminate hydraulic cement, the quick setting properties may be obtained by the addition of calcium sulphate in the form of gypsum or plaster of Paris in amounts of approximately 2% to 5%, which may be varied according to the condition of set acceleration desired and according to the type and proportion of aggregates included with the cement. In using the accelerating agent, care must be exercised not to include such amounts as will adversely affect the finished granule structure. Obviously, the set accelerating ingredient may be employed in the other processes if desired.

The natural or colored granules of my invention may be utilized in the continuous manufacture of roofing and siding material from a moving base saturated with a suitable waterproofing substance, for instance, a low melting point asphalt, and provided with a surface coating of, for instance, a high melting point asphalt. Before the coating has fully set, the granules of the invention are fed by a suitable means, for instance a hopper, and spread over the base and are then partially embedded therein by suitable embedding rolls. The granules being formed entirely of the cement composition will obtain a firm anchorage in the bitumen and will, to a limited extent, absorb oils of the bitumen in the base portion thereof to prevent moisture penetration between the granule and the asphalt to which it is anchored, thus resisting subsequent blistering of the asphalt.

In addition to the previously mentioned advantages of the granules of this invention, for instance, freedom from objectionable efflorescence in exposure, substantial freedom from discoloration by the oils of bitumen and improved anchorage relative to bitumen, the cement composition that is utilized provides granules having substantial strength and hardness to withstand continued exposure to the weather and temperature changes. The high aluminate hydraulic cement composition provides granules having erosion resistance greater than the Portland cements previously used for coating granules, and provides denser, sounder, and stronger structures than those previously possible. The granules harden more rapidly and obtain greater strength than previous compositions used for coating granules, for instance, ordinary Portland cements, and provide the granules with substantially full strength after a short period of cure, which may be as little as 24 hours. Accordingly, the granules of the invention may be handled and used in a very short period of time without detrimental effects, and large storage space and long processing is avoided. The preferred cement composition of the invention further provides granules resistant to corrosion and having immunity to chemical attack by various atmospheric elements which would affect hydraulic cements of the Portland character, the composition of the granules being of an extremely stable character.

From the foregoing description of my invention, it will be seen that I have provided a new and useful granule of cementitious character, and it will be understood that many changes may be made in the granule structure and process of making the same without departing from the spirit and letter thereof. It is therefore desired that the invention be construed as including all equivalents and as broadly as the following claims may allow.

I claim:

1. A cement composition comprising essentially a high aluminate cement and mica schist.

2. A cement composition comprising essentially a high aluminate cement and mica schist filler, and a minor amount of other filler.

3. A cement composition comprising a high aluminate cement and mica schist in a proportion of substantially 94 parts by weight of said cement to substantially 85 parts by weight of said schist.

4. A cement composition comprising a high aluminate cement and mica schist filler in a proportion of substantially 94 parts by weight of said cement to substantially 85 parts by weight of said schist, and a minor amount of other filler.

5. A cement composition comprising approximately equal parts of high aluminate cement and filler, the major portion of the filler being mica schist.

NORMAN P. HARSHBERGER.